July 3, 1962   K. E. A. GÖTHBERG   3,042,464
ROLLER CAGE FOR CYLINDRICAL ROLLER BEARINGS
Filed Jan. 12, 1960   2 Sheets-Sheet 2
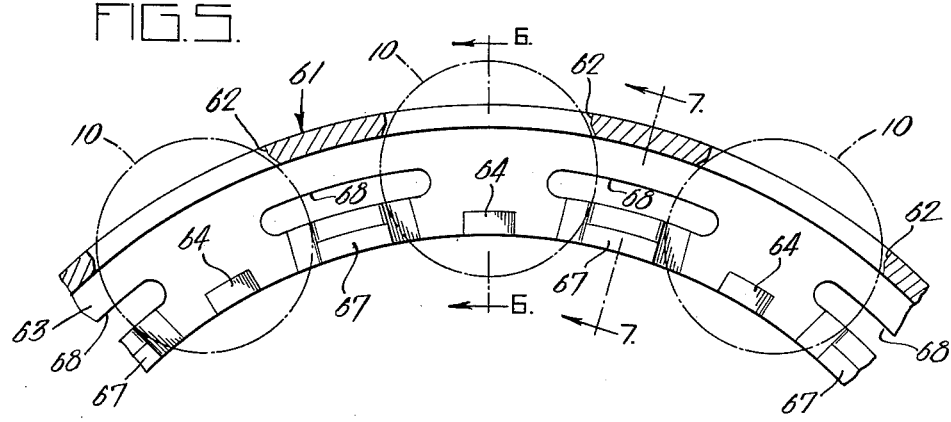
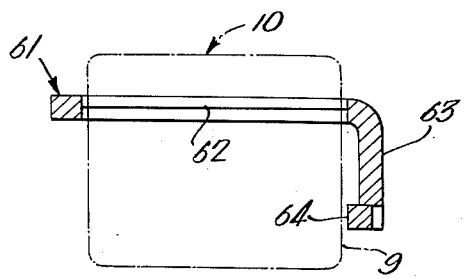
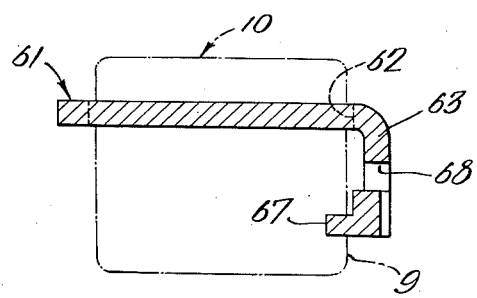
INVENTOR:
KARL EVALD ANDREAS GÖTHBERG
BY Howson & Howson
ATTYS.

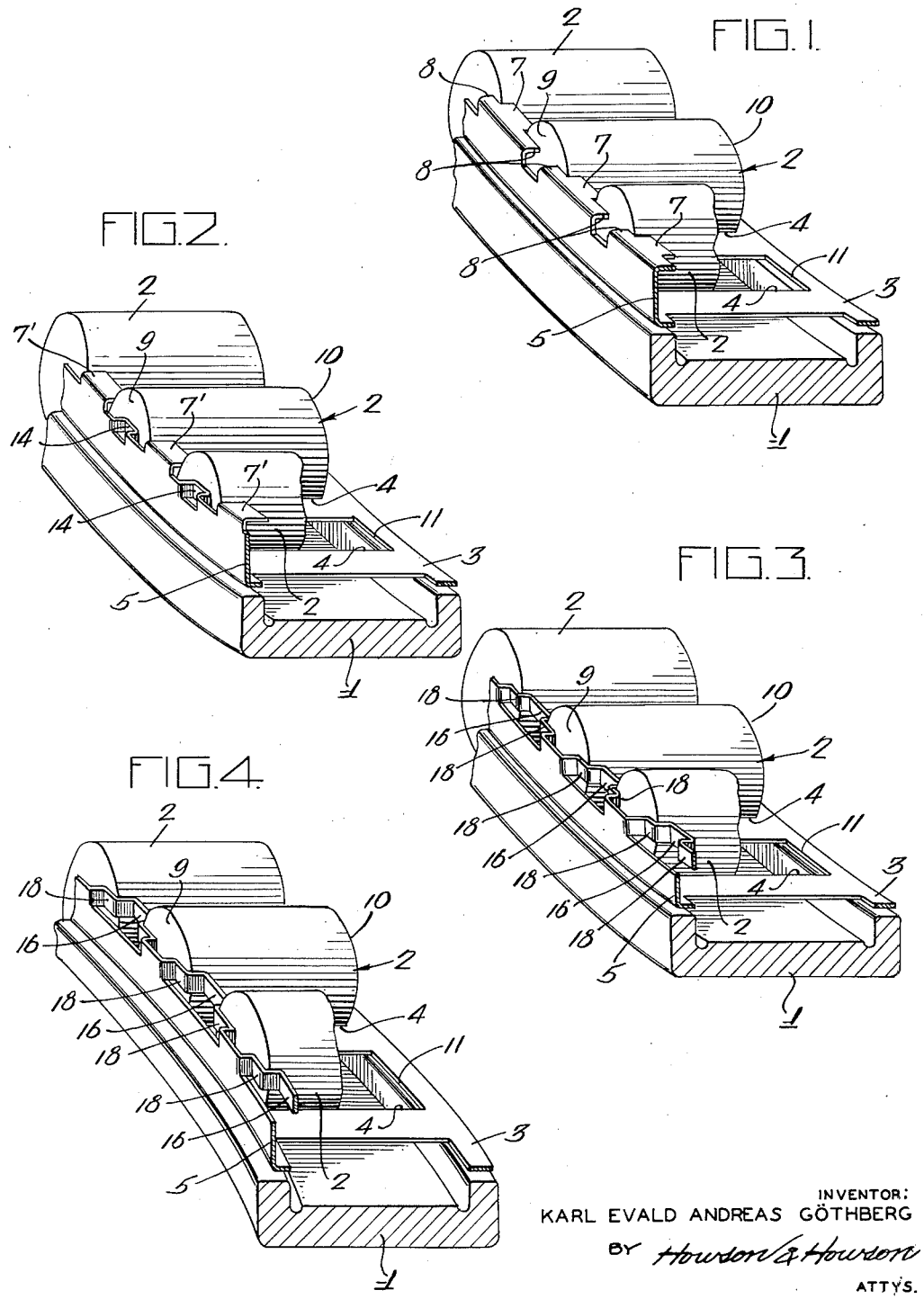

United States Patent Office 3,042,464
Patented July 3, 1962

3,042,464
ROLLER CAGE FOR CYLINDRICAL ROLLER BEARINGS
Karl Evald Andreas Göthberg, Backasen, Lerum, Sweden, assignor to Aktiebolaget Svenska Kullagerfabriken, Goteborg, Sweden, a corporation of Sweden
Filed Jan. 12, 1960, Ser. No. 1,972
6 Claims. (Cl. 308—217)

The present invention relates to a sheet metal roller cage for cylindrical roller bearings.

Various sheet metal roller cages have been proposed for and have been used in cylindrical roller bearings. Along the various types of sheet metal cages which have been developed is the so-called L-cage, the name of which has been derived from the fact that its cross section has the shape of an L. This cage is of special interest, since it is easy to manufacture from sheet metal. It requires very little space so that comparatively many and comparatively large rollers can be provided in the bearing, and it is also capable of being manufactured with precision.

It is clear from an examination of a cross section of a cylindrical roller bearing having a cage of this type that the cross bars are not located on the pitch circle of the rollers where the distance between the rollers is least, but rather either outside of or inside of this circle, where there is sufficient space to enable the cross bars to be made with sufficient width, even if the bearing is provided with a great number of rollers. The cage also requires very little space in the axial direction, and the rollers can therefore be made as long as is possible, with due allowance for sufficient thickness and strength of the guide flanges. A bearing provided with a cage of this type can therefore be made with great load-carrying capacity.

L-cages of known type for cylindrical roller bearings having flanges on the outer race ring have been provided with axially directed tongues located inside of the pitch circle of the set of rollers. The purpose of these tongues has been to retain the rollers in their respective pockets and prevent them from tipping and assuming a skewed position when the inner race ring is removed, which otherwise would make it more difficult to assemble the bearing. If the rollers are in a skewed position, there will also be a risk of injury because since the rollers are not in correct position when the bearing is being assembled, the outer race ring must be forced into position. In order to prevent the rollers from tipping, it is necessary that the length of the tongues in the known type of cage be at least equal to half the length of the rollers. This secondary requirement also makes it necessary to use a considerable amount of sheet metal, since the length of the tongues makes it necessary for the blanks to be of considerable diameter. A roller cage according to the invention comprises a substantially cylindrical portion having pockets for the rollers, and of greater or less diameter than the diameter of the pitch circle of the set of rollers.

The invention is described in the following, with reference to the figures of the accompanying drawings, in which:

FIG. 1 is a perspective view of a portion of an outer race ring of a roller bearing and an embodiment of the cage according to the present invevntion;

FIGS. 2 and 3 are perspective views similar to FIG. 1 showing other embodiments of cages for the rollers in accordance with the invention;

FIG. 4 is a perspective view showing the inner race ring of a roller bearing and the cage of FIG. 3 with the retaining elements extending toward the outer race ring;

FIG. 5 is a fragmentary vertical sectional view of still another embodiment of the cage of the present invention;

FIG. 6 is a sectional view taken on line 6—6 of FIG. 5, and

FIG. 7 is a sectional view taken on line 7—7 of FIG. 5.

The numeral 1 of FIG. 1 designates an outer flanged race ring of a roller bearing and numeral 2, the rollers thereof. The rollers are separated by a sheet metal cage having a substantially circular portion 3 provided with pockets 4 for the rollers punched out of the sheet metal. Integral with the cylindrical portion, is a substantially plane portion 5 provided with portions comprising supporting members 7, arranged to engage two adjacent rollers to prevent them from falling radially out of the bearing, and abutments, 8, located at opposite sides of a supporting member 7 and engage the end surfaces 9 of the rollers 2. The abutments 8 thus determine the axial position of the rollers.

The disadvantages inherent in the long tongues mentioned above are avoided in the construction of the present invention by utilization of very short abutments 8 which engage the plane end surface 9 of each roller 2. A roller 2 may fall inward in two ways. If both roller ends move simultaneously toward the center of the bearing, the supporting member 7 will catch the roller end 9. The roller then begins to tip about the corners of the supporting member 7, but further movement is stopped thereby, in that the roller end 9 engages the abutment 8, and the roller end 10 engages the edge 11 of the roller pocket, thus preventing the roller from falling out of the cage and from tipping to any appreciable degree. This is the normal case. It is, however, possible that only the roller end 9 falls inward. In this case also the supporting member 7 prevents the roller from falling too far. However, it is necessary to take this case into account when determining the length of the supporting member 7, which should be greater in the case of a short roller than in the case of a long one.

FIG. 1 shows the roller 2 inserted in a cage. When the rollers are being inserted, the roller ends must pass the supporting member 7, for which reason the side face 5 of the cage is sprung outwards in the axial direction of the roller a distance equal to the extent to which the supporting members project over the rollers in the assembled bearing. The shorter the supporting members are, the easier it will be to assembly the bearing, and for this reason they should be made only so long as to insure that they retain the rollers in the pockets.

FIG. 2 shows a form of cage which differs from that of FIG. 1 only through the shape of the abutment 8, which is here designated 14, and which is made by locally separating and pressing the inner portion of the side 5 of the cage. The supporting member 7' is formed in the same manner as the supporting member 7.

In the form of the invention shown in FIG. 3, the supporting member 16 is made by a pressing operation and the abutment 8 has been replaced by two abutments 18, one on each side of the roller, and which are directly connected to the supporting member 16.

FIG. 4 shows the same cage design as FIG. 3, except that it is here shown as applied to a roller bearing having fixed flanges on the inner race ring.

There are several forms of the L-cage in question with respect to the method used for inserting the rollers. The simplest forms are those shown in FIGS. 1 to 4. These cages are ready when they leave the presses. The necessary axial displacement of the supporting members 7, 7' and 16 is attained by pressing these members outward. The cage side 5 is sprung during this operation, but is not permanently deformed, and returns to its original shape when the pressure against the abutments is removed. When the side of the cage is sprung outward in this simple manner, the rollers can be inserted or removed from their pockets. The possibility of using this method depends naturally on the elasticity of the sheet metal used. However, it has been found that normal sheet metal as used in making roller cages is sufficiently elastic for the purpose.

One form of the cage which must be completed after insertion of the rollers into their pockets is shown in FIGS. 5, 6 and 7. In this case 61 designates the cylindrical portion of the cage having roller pockets 62. In the substantially plane annular portion 63, the material is deformed at a number of places 64 to serve as abutments for one of the end surfaces 9 of the rollers 2 indicated by the dotted line. Short tongues 67, the purpose of which is to support the rollers in the radial direction and corresponding to the supporting members 7, 7' and 16 in FIGS. 1 to 4, are here shown as being pressed out of the portion 63 and being bent up at a right angle.

Above each of these tongues a kidney-shaped hole 68 is provided in the cage portion 63. When a roller 2 is introduced into the roller pocket 62, no change in the position of the tongues 67 will be required. After the rollers have been inserted in position in the cage, pressure is exerted on the material between the tongues 67 and the hole 68 through a suitable tool to deform the material at each side of the tongues, until the tongues reach sufficiently far under the rollers. In this case it is not necessary for a tool to be introduced between the rollers, which is of importance when a great number of rollers is provided, and where, consequently, the distance between the rollers is very small.

In addition to the forms described above, further modifications may be made in the design of the cage. The plane portion of the cage designated 5 and 63 may be made as a separate part which may be riveted, screwed, or welded to the cylindrical portions 3 and 61 respectively, when the rollers have been inserted in their pockets. This form of the cage may be used when only a small number of bearings is to be made, since the necessary tools for making the cage will be simpler, although more manual work will be required.

Instead of being formed directly from the sheet metal, the supporting members may consist of rivets, screws or the like, fixed to the plane portion of the cage to support the roller ends both axially and radially. Another way of retaining the rollers is to make the roller pocket somewhat longer, so that the rollers may be displaced axially a distance equal to the length of the portion of the tongue which projects over the rollers. In this case the rollers can be inserted in their pockets without any resistance. When this has been done, a distance member is inserted between the roller end 10 and the edge 11 of the roller pockets. The distance member may, for example, comprise a ring of wire corrugated in the radial direction. It may also comprise a split sheet metal ring having radially projecting tongues which, after the rollers have been assembled, fill the space mentioned above.

It is claimed:

1. A roller cage for roller bearings comprising a generally cylindrical portion having a plurality of circumferentially spaced pockets therein for the rollers, a radial flange projecting from only one of the peripheral edges of said cylindrical portion, a plurality of circumferentially spaced abutments on said flange projecting axially inward of the cage to engage an end of each roller and retain the same against axial movement, a plurality of support members on said flange intermediate adjacent abutments and projecting axially inward of the roller cage a distance less than one-half the axial length of the roller pockets therein and disposed for positioning between adjacent rollers to engage therewith and retain the rollers against radial movement in said pockets, said abutments and support members being displaceable in a direction axially outward of the cage to permit insertion and removal of the rollers from said pockets, said abutments and support members being located radially at one side of the pitch circle of said rollers and said cylindrical portion being located radially at the other side of said pitch circle.

2. A roller cage according to claim 1 in which a support member operable for retaining a roller in its pocket against radial movement is located at each side of an abutment.

3. A roller cage according to claim 1, wherein said flange is substantially plane and projects radially inwardly from said cylindrical portion, and wherein said abutments and support members are located radially inwardly of said pitch circle and said cylindrical portion is located radially outwardly of said pitch circle.

4. A roller cage for roller bearings comprising a generally cylindrical portion having a plurality of circumferentially spaced pockets therein for the rollers, a radial flange projecting from one peripheral edge of said cylindrical portion and having circumferentially spaced peripheral portions extending normal to the flange and projecting axially inward of the cage, the free edge of each inwardly projecting flange portion being stepped to provide a central support member and laterally adjacent abutments of lesser axial length than said support member, each support member being disposed between adjacent roller pockets in the cage to engage the rollers in said pockets and retain same against radial movement and the laterally adjacent abutments being disposed to engage respectively the adjacent end faces of adjacent rollers to retain the same against axial movement in said pockets.

5. A roller cage for roller bearings comprising a generally cylindrical portion having a plurality of circumferentially spaced pockets therein for the rollers, a radial flange projecting from one peripheral edge of said cylindrical portion and having circumferentially spaced peripheral portions thereof laterally displaced and offset axially inward of the cage, each of said inwardly offset portions of the flange being stepped to provide a central support member and laterally adjacent abutments of lesser axial length than said support member, each support member being disposed between adjacent roller pockets in the cage to engage the rollers in said pockets and retain same against radial movement and the laterally adjacent abutments being disposed to engage respectively the adjacent end faces of adjacent rollers to retain the same against axial movement in said pockets.

6. A roller cage for roller bearings comprising a generally cylindrical portion having a plurality of circumferentially spaced pockets therein for the rollers, a radial flange projecting from one peripheral edge of said cylindrical portion and having circumferentially spaced peripheral portions extending normal to the flange and projecting axially inward of the cage to provide support members disposed respectively between adjacent roller pockets in the cage and arranged to engage the rollers in said pockets and retain same against radial movement, and said radial flange also having circumferentially spaced, laterally displaced peripheral portions intermediate adjacent support members extending axially inward of the cage to provide abutments laterally adjacent each support member disposed to engage respectively the adjacent end faces of adjacent rollers to retain the same against axial movement in said pockets.

References Cited in the file of this patent
UNITED STATES PATENTS

| | | |
|---|---|---|
| 1,984,213 | Heim | Dec. 11, 1934 |
| 1,996,809 | Hughes | Apr. 9, 1935 |

FOREIGN PATENTS

| | | |
|---|---|---|
| 1,049,167 | Germany | Jan. 22, 1959 |